(12) United States Patent
Tongiani

(10) Patent No.: US 8,900,450 B2
(45) Date of Patent: Dec. 2, 2014

(54) COMBINED ACTION FILTER PRESS

(75) Inventor: Stefano Tongiani, Massa (IT)

(73) Assignee: Tenova S.p.A., Milan (IT)

( * ) Notice: Subject to any disclaimer, the term of this patent is extended or adjusted under 35 U.S.C. 154(b) by 0 days.

(21) Appl. No.: 13/138,261

(22) PCT Filed: Feb. 10, 2010

(86) PCT No.: PCT/IT2010/000045
§ 371 (c)(1),
(2), (4) Date: Nov. 10, 2011

(87) PCT Pub. No.: WO2010/092612
PCT Pub. Date: Aug. 19, 2010

(65) Prior Publication Data
US 2012/0048791 A1 Mar. 1, 2012

(30) Foreign Application Priority Data
Feb. 10, 2009 (IT) .............................. MS2009A0002

(51) Int. Cl.
*B01D 25/19* (2006.01)
*B01D 25/164* (2006.01)
*C02F 11/12* (2006.01)

(52) U.S. Cl.
CPC ............. *B01D 25/164* (2013.01); *C02F 11/121* (2013.01)
USPC ........... 210/231; 210/767; 210/224; 210/228; 210/230; 210/236

(58) Field of Classification Search
CPC ..... B01D 25/164; B01D 25/19; B01D 25/125
USPC ................................................. 210/230, 231
See application file for complete search history.

(56) References Cited

U.S. PATENT DOCUMENTS 301,795 A * 7/1884 Boomer ........................ 100/113
749,140 A 1/1904 Hack
(Continued)

FOREIGN PATENT DOCUMENTS

| CN | 1321530 | 11/2001 |
|---|---|---|
| DE | 199 04 637 C1 | 3/2000 |
| JP | S60-24311 U | 2/1985 |
| JP | S60-024312 U | 2/1985 |
| WO | 2006/106463 | 10/2006 |
| WO | WO 2006/106463 | 10/2006 |
| WO | 2008/114303 | 9/2008 |
| WO | WO/2008/114303 | 9/2008 |

OTHER PUBLICATIONS

International Search Report dated Jun. 23, 2010.
(Continued)

*Primary Examiner* — Benjamin Kurtz
(74) *Attorney, Agent, or Firm* — Steinfl & Bruno, LLP

(57) ABSTRACT

The present invention concerns a filter press (10, 60), comprising a supporting frame, constituted of at least one longitudinal rail or guide (11, 61) supported at its opposite ends by a fixed headpiece (12, 62) on one side and by a foot (13, 63) on the other side, a movable headpiece (15, 65) supported by said at least one guide (11, 61), a plurality of filtering plates (14, 64) arranged side by side between said fixed headpiece (12, 62) and said movable headpiece (15, 65), pneumatic elements or cushions (20, 70) for pressing and a compression plate (21, 71), wherein said movable headpiece (15, 65) comprises threaded cylindrical holes, supported on relative endless screws (19, 69) the ends of which are rotationally mounted on supports integral with the relative guides (11, 61).

10 Claims, 6 Drawing Sheets

(56) References Cited

U.S. PATENT DOCUMENTS

Figure 1:
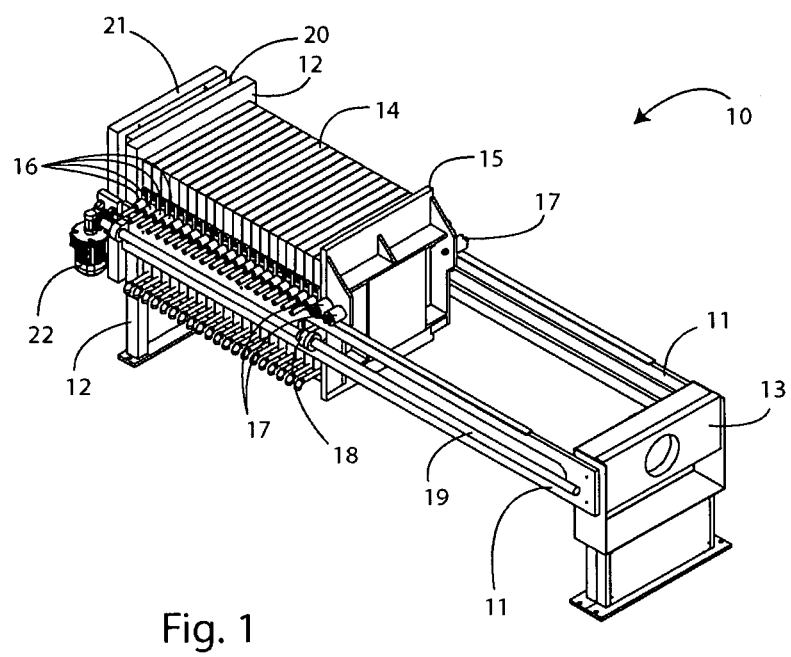

| | | | |
|---|---|---|---|
| 2,071,891 A * | 2/1937 | Meura | 210/227 |
| 4,032,450 A | 6/1977 | Iwatani | |
| 2008/0230461 A1 * | 9/2008 | Schulte et al. | 210/231 |

OTHER PUBLICATIONS

Written Opinion issued for PCT Application No. PCT/IT2010/000045 filed on Feb. 10, 2010 in the name of Stefano Tongiani; mailing date: Jun. 30, 2010.

International Preliminary Report on Patentability for PCT Application No. PCT/IT2010/000045 filed on Feb. 10, 2010 in the name of Stefano Tongiani; Date of completion of report: May 6, 2011.

Japanese Office Action issued for Patent Application No. 2011-548851 filed on Aug. 9, 2011 in the name of Stefano Tongiani. Mail Date: Jan. 31, 2012. (English Translation & Original).

Japanese Office Action issued for Patent Application No. 2011-548851 filed on Aug. 9, 2011 in the name of Stefano Tongiani. Mail Date: May 22, 2012. (English Translation & Original).

Chinese Office Action issued for Patent Application No. 201080007909 filed on Feb. 10, 2011 in the name of Stefano Tongiani. Mail Date: May 28, 2013. (English Translation & Original).

* cited by examiner

COMBINED ACTION FILTER PRESS

The present invention concerns a combined action filter press.

More in particular, the invention concerns a filter press for dehydrating slurries, i.e. an apparatus for dehydrating slurries (liquids that contains suspended solids) by means of filtering the same through the filtering walls of a plurality of chambers following the volume reduction of the same chambers obtained by means of pressing.

It is known that a filter press is composed of a plurality of alternating plates and cloths that, adhering to each other, form chambers, within which slurries are pumped at high pressure. Following pressing, the slurry solid phase is retained in the interspaces between plates and frames, forming a dehydrated slurry panel (permeate), and the liquid phase comes out of the filter press, with a low content of suspended solids (filtrate). The subsequent recovery of the solid phase is obtained by opening the filter press, when the interspace is filled up with permeate.

According to the solutions of the prior art pertinent to this kind of plants, the plurality of filtering plates constituting a filter press are arranged between two backing plates, one being unmovable and the other being movable. All plates are arranged on a supporting frame, constituted of two lateral longitudinal rails (replaced by an upper rail only in the most recent apparatuses) connected at their ends by means of two headpieces. During filtering, filtering plates are tightly closed to each other by means of the action of the movable backing plate. After filtering, the permeate can be removed from the filtering surfaces placed on filtering plates by moving away the movable backing plate and therefore spacing apart the filtering plates so to have easy access to the filtering surfaces.

According to the prior art, moreover, filtering plates approaching and tightening is obtained by means of a piston, with the drawback that a very long run (needed for approaching and spacing apart the plates) and a very high pressing force are required at the same time.

In order to solve this problem, according to the international application WO2006/106463 it is proposed for performing the approaching of filtering plates by means of a movable plate, moved by means of a chain drive comprising an electric motor and an endless chain, that, after completing its task, is locked in position by means of bolts, whereas the actual step of pressing is committed to inflatable elements, called cushions, positioned on the movable plate, filled with a press fluid.

Further, in order to reduce friction forces at stake, the plates are provided with sliding blocks for moving on the rails.

Thus, according to this prior art document, the movable plate only operates the approaching of filtering plates, preparatory for the filtering step, while the real pressing step is committed to inflatable elements, filled with a press fluid performing the real squashing of the plates. In particular, the approaching of filtering plates is obtained by abutting the movable plate until it reaches its operative position and locking it in such position by means of bolts, provided with pins that enter inside locking holes realised on the fixed frame of the filter press.

The solution according to the international application WO2006/106463, in which the locking of the movable plate is obtained with bolts, has the problem that the locking position is fixed and consequently it is possible to use the apparatus only with a preset number of filtering plates. As a consequence, not only the apparatus can not be used with one or more plates more or less, depending on possible changes of the amount of slurries to be treated, but also the possible brake of one of the plates could imply the impossibility to use the apparatus, until the damaged plate is repaired or replaced. Further, the solution according to said prior art document implies the impossibility of using the apparatus also when it is needed to proceed with maintenance of only one single plate.

Moreover, the housing holes for pin bolts, being necessarily in the form of a slot, since the filtering pack can have different size depending on different manufacturer, but also for the same manufacturer from a production batch to another, because of plates working tolerances, implies that, in case filtering plates are thinner, in order to take up slack due to the slots, the cushions have to be inflated a lot, with the consequence that the maximum allowable pressure is reduced, since it is in inverse relation to the maximum aperture.

Further, different thickness can also be present between new plates and used ones, since new cloths have a thickness that reduces after first uses and is never made up. Such a thickness reduction, in filter presses with a great number of filtering plates can reach the size of various centimetres after the very first days of use. In this case also, this gap can be made up by inflating cushions.

Finally, the system of preliminary approaching and tightening by means of locking with bolts cannot be used with the most recent filter presses, wherein lateral rails are replaced by a single upper rail.

A further improvement towards the solution of problems related to 'approaching and tightening is represented by the German patent N. DE 199 04 637 C1, concerning a filter press wherein the movable backing plate is abutted to filtering plates by means of a hydraulic actuator and then is locked in the reached position by means of a anchor system allowing for a definite number of locking positions. From this moment on the real pressing step starts, the plates being pressed by an inflatable element having the form of a ring, arranged on the movable plate, in which the same fluid used for the actuator performing the approaching is preferably used.

Even if it represents an improvement with respect to the solution providing for only one locking position, nevertheless neither this system allows for obtaining an optimal approaching of the plates. In fact, once the approaching of the plates is completed, it is always necessary to recede the movable backing plate until it reaches the first available locking position, thus loosing in efficiency in the subsequent pressing step.

Moreover, frequently the slurry to be filtered can be too liquid to be efficacely treated in filter presses, with the consequence that it is necessary to stop the filter press waiting for a thicker slurry. In this case, the apparatus stops automatically during filtration and starts again after hours or even days. In case of a discrete positioning of the movable headpiece, this stop implies the need for keeping the cushion inflated until the new start, keeping the apparatus in operation for controlling the pressure in cushions and having the compressor working, in order to make up possible air leaks always present in a pneumatic line.

Further, arranging the cushions on the movable plate limits their maximum lateral dimensions to those defined by the distance between the lateral rails, between which the cushions have to be free to slide. The limitation of the dimensions of cushions implies as a consequence the limitation of the applicable pressure in pressing step.

In view of the above, it is evident the need for a filter press allowing for performing the step of plates approaching without any limit due to the need of adapting the final position of the movable backing plate as a consequence of preset positions, that do not take account of the possibility of varying the number of filtering plates or the thickness of the cloths of the plates, and for making use of inflatable elements the dimensions of which are not limited by considerations not rigidly connected to the problem of pressing.

In this context is presented the solution according to the present invention, with the aim of providing for a filter press in which it is always possible to take up slack amongst plates and is even possible to obtain ascertain degree of preliminary compression already during the step of plate approaching, also implying a simplification of hydraulic/pneumatic components, with saving of money and swear.

These and other results are obtained according to the present invention by providing for a filter press wherein the step of plate approaching and filter pack precompression is committed to a system made of endless screws that, rotating driven by motors, cause the displacement of the movable backing plate, while the hydraulic or pneumatic cushions having the function of exerting the real tightening pressure on plates are arranged on the fixed headpiece instead of on the movable one.

The purpose of the present invention is therefore that of realising a filter press allowing for overcoming the limits of the solutions according to the prior art and obtaining the previously described technical results.

Further aim of the invention is that said filter press can be realised with substantially limited costs, as far as both production costs and managing costs is concerned.

Not last aim of the invention is that of realising a filter press that is substantially simple, safe and reliable.

It is therefore a specific object of the present invention a filter press, comprising a supporting frame, constituted of at least one longitudinal rail or guide supported at its opposite ends by a fixed headpiece on one side and by a foot on the other side, a movable headpiece supported by said at least one guide, a plurality of filtering plates arranged side by side between said fixed headpiece and said movable headpiece, pneumatic elements or cushions for pressing and a compression plate, wherein said movable headpiece comprises threaded cylindrical holes, supported on relative endless screws the ends of which are rotationally mounted on supports integral with the relative guides.

According to the present invention, said supporting frame is constituted of two lateral longitudinal rails or guides supported at the opposed ends by a fixed headpiece on one side and by a foot on the other side, a movable headpiece supported by said guide, a plurality of filtering plates arranged side by side between said fixed headpiece and said movable headpiece, pneumatic elements or cushions for pressing and a compression plate, said movable headpiece comprising two arms, one for each side, provided with respective threaded cylindrical holes, supported on relative endless screws the ends of which are rotationally mounted on supports that are integer with said supporting frame.

Alternatively, always according to the invention, said supporting frame is constituted of an upper longitudinal rail or guide supported at its opposite ends by a fixed headpiece on one side and by a foot on the other side, a movable headpiece supported by said guide, a plurality of filtering plates arranged side by side between said fixed headpiece and said movable headpiece, pneumatic elements or cushions for pressing and a compression plate, said movable headpiece comprising, on each corner, threaded cylindrical holes, supported on relative endless screws the ends of which are rotationally mounted on supports that are integral with said supporting frame.

In particular, according to the invention, said endless screws are operated by a motor.

Preferably, according to the present invention, said cushions and said compression plates are arranged on said fixed headpiece and can be arranged before or after said fixed headpiece.

It is evident the efficacy of the filter press of the present invention, the advantages being, in principle, the following:

endless screws, with respect to fixed lockings according to a present number of positions, allow for a correct tightening of the plates, requiring for a minor opening of cushions during the step of inflating with the consequent increase of their resistance to explosions and greater working pressure, and also a shorter time for filtering and, therefore, a greater productivity;

screws, compared to fixed lockings, allow for having the apparatus working also if the number of filtering plates changes;

in case of stops due to the presence of a slurry that is too liquid, the apparatus can be stopped and cushions can be deflated without leakage of liquid between the plates, completely stopping the plant and starting it again when a thicker slurry is available, with an important energy saving and increased safety in case of damage or stop of plant;

the cushions, not being limited from rails in their lateral dimensions, can be realised with greater sizes with consequent increase of pressure in pressing step;

the position of cushions on the fixed headpiece, that is close to the equipment for the inlet of inflating fluid, implies a higher speed in inflation and deflation.

Figure 2:
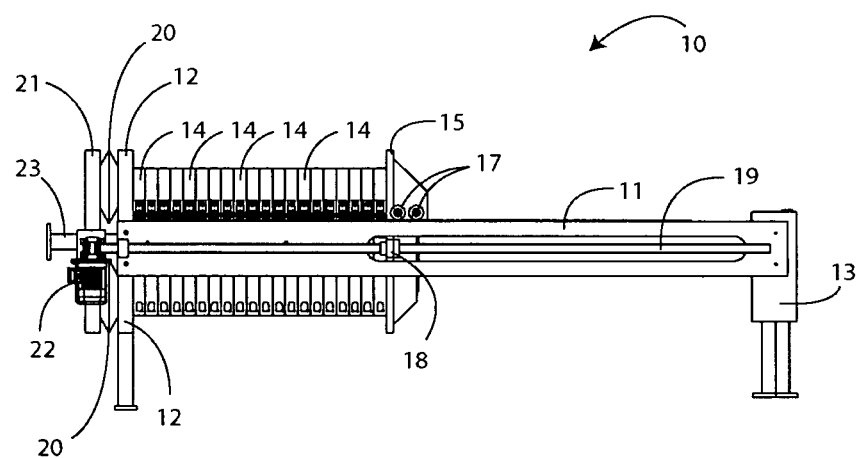
Figure 3:
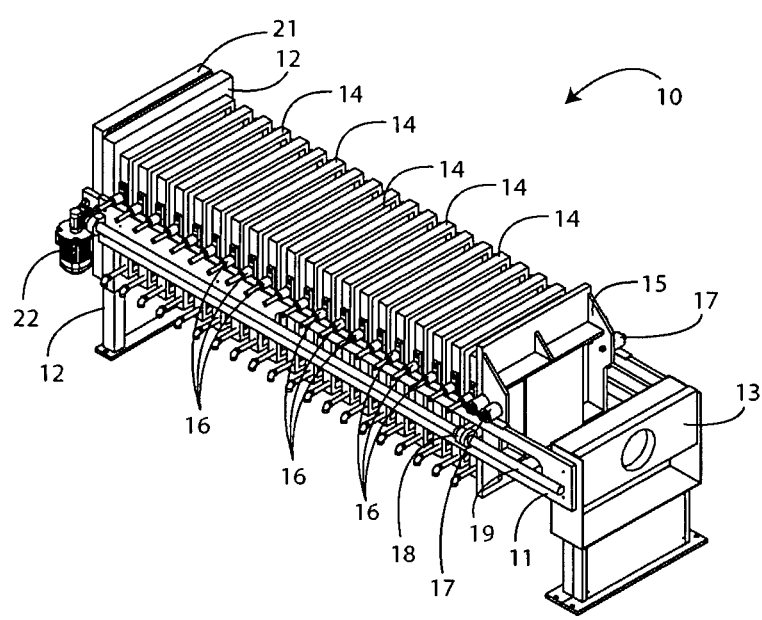
Figure 4:
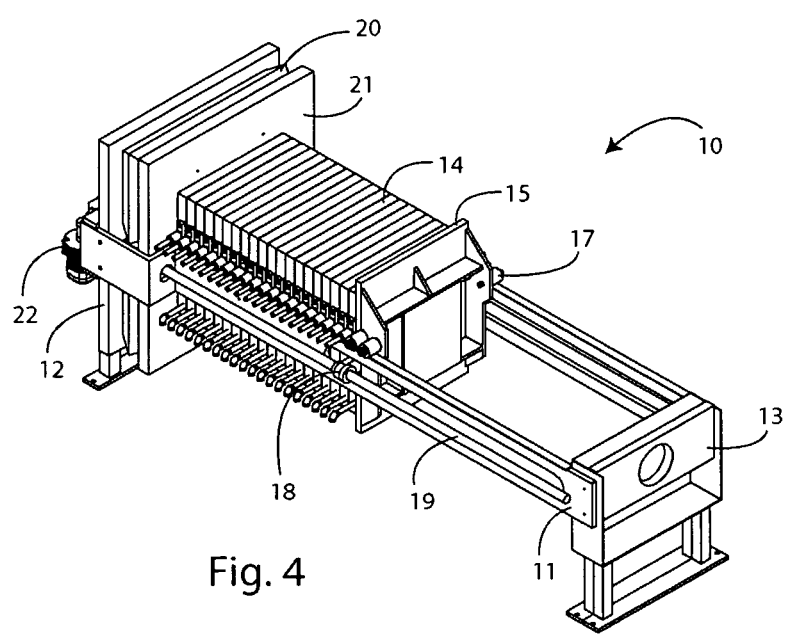
Figure 5:
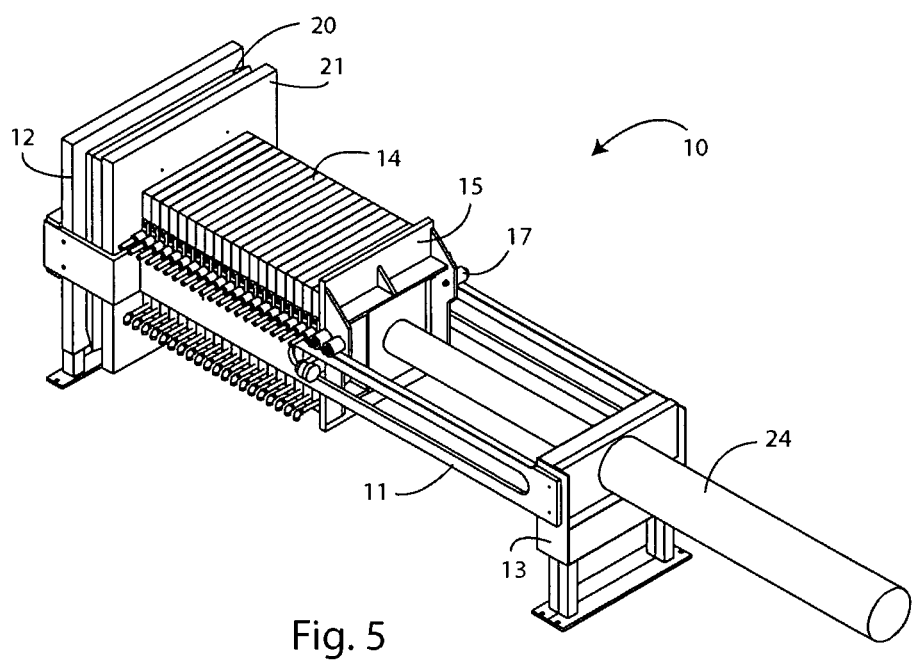
Figure 6:
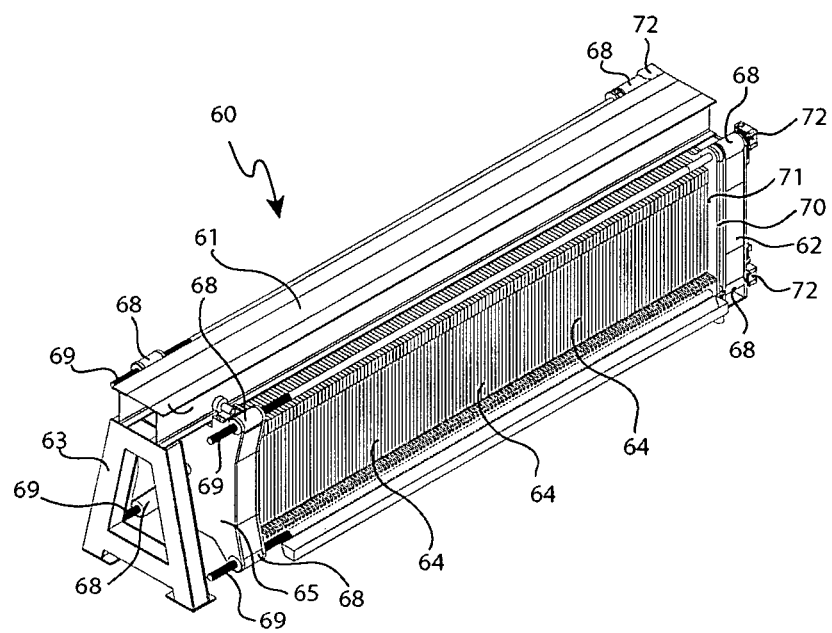

The present invention will be described, for illustrative, non limitative purposes, according to a preferred embodiment, with particular reference to the figures of the enclosed drawings, wherein:

FIG. 1 shows a perspective view of a filter press according to a first embodiment of the present invention, in pressing step, FIG. 2 shows a lateral view of the filter press of FIG. 1, in pressing step, FIG. 3 shows a perspective view of the filter press of FIG. 1, in opening step, FIG. 4 shows a perspective view of a filter press according to a second embodiment of the present invention, in pressing step, FIG. 5 shows a perspective view of a filter press according to a third embodiment of the present invention, in pressing step, and FIG. 6 shows a perspective view of a filter press according to a fourth embodiment of the present invention, in pressing step.

Making reference to FIGS. 1-3, the combined action filter press according to the present invention, indicated as a whole with the numeral 10, is provided with a supporting frame, constituted of two lateral longitudinal rails or guides 11 connected at their ends by a fixed headpiece 12 and by a foot 13, on the guides 11 laying a plurality of filtering plates 14 positioned side by side between said fixed headpiece 12 and a movable headpiece 15, constituting the backing plates.

On their sides, the filtering plates 14 are provided with cylindrical supporting rods 16, simply resting on the guides 11, with reduction of friction.

The movable headpiece 15 is in turn resting on the guides 11, by means of cylindrical supporting rods 17 it is provided with, but it is also provided with an arm 18 on each side having a threaded cylindrical hole, engaged on an endless screw 19 integral with the respective guide 11.

On the side of the fixed headpiece 12 the filter press is provided with cushions 20 and a pressing plate 21. In the embodiment shown with reference to FIGS. 1-3, the cushions 20 are positioned behind the fixed headpiece 12, but they can also be positioned before it, as shown with reference to FIG. 4.

The filter press 10 according to the present invention exploits the combined action of the screws 19, driven to rotate by corresponding motor reducers 22, and of cushions 20 (that can be inflated with any fluid) to compress filtering plates 14 between the movable headpiece 15 and the fixed headpiece 12, operating on the pressing plate 21.

The functioning of the filter press is the following: from the position shown in FIG. 3, wherein filtering plates 14 are open following the cleaning that completed a previous filtering cycle, motor reducers 22 drive the screws 19, displacing the movable headpiece 15 towards the fixed headpiece 12 and approaching filtering plates 14 and cushions 20 to one another. When the maximum approaching or first squashing of filtering plates 14 and cushions 20 is obtained, with taking up slack of positioning and first compression, motor reducers 22 stop, the liquid to be filtered is pumped in the pipe union 23, shown with reference to FIG. 2, and in cushions 20 is inflated compressed air (or another fluid) at medium pressure. This implies a second squashing force, greater than that previously due to the screws 19, taking up slack between filtering plates 14. Subsequently the cushions 20 are deflated and at the same time screws 19 are moved, displacing further the movable plate 15 in order to take up slack originating from the settling due to the second squashing.

When the filtering plates 14 and cushions 20, pressed by the movable plate 15, arrive again on the fixed plate 12, squeezed by the pressing plate 21, motor reducers 22 are stopped and compressed air (or another fluid) is gradually inserted until the maximum pressure of cushions 20. At the same time, the liquid to be filtered is pumped into the settling 23, shown with reference to FIG. 2, starting from the filtering step.

The aim of this two squashing is that of taking up the slack between the filtering plates 14, the pressing plate 21, the fixed 12 and movable 15 plates, and to give the greatest possible first compression to filtering plates 14 and to allow for cushions 20, subsequently after their blowing, only the minimal expansion exclusively due to the remaining compression due to the resiliency of some materials.

The subsequent step, after completing the pressing step, is the deflation of cushions 20 that, being cushions itself close to pneumatic or hydraulic apparatuses, also arranged on the fixed headpiece 12, or anyway close to it, will be very fast. At the same time the pressing plate 21 is unlocked and the screws 19 are started, spacing apart the plates 14 until they reach the position shown in FIG. 3, allowing for the removal of permeate accumulated in the filtering plates 14 now open.

With reference to FIG. 4, a filter press is shown of the same kind of that shown with reference to FIGS. 1-3, but wherein cushions 20 and the pressing plate 21 are arranged before the fixed headpiece 12.

With reference to FIG. 5, a filter press is shown wherein approaching is obtained with an oleodynamic piston, but presenting an optimised solution of the compression step with respect to the solutions of the prior art, due to the fact that cushions, positioned on the side of the fixed headpiece 12 rather than on that of the movable headpiece 15, do not have dimensional limitations due to the supporting frame of the filtering plates.

Finally, with reference to FIG. 6, a filter press 60 is shown with an upper rail 61. In this case, the supporting frame is constituted by the upper rail 61, supporting a plurality of filtering plates 64 arranged side by side between a fixed headpiece 62 and a movable headpiece 65, representing the backing plates.

The movable headpiece 65 is in turn hanging at the upper rail 61 and it is provided on each corner 68 with a threaded cylindrical hole, engaged with an endless screw 69. The four endless screws 69 are rotated by corresponding motor reducers 72.

The combined action filter press according to the present invention presents a series of advantages compared with the prior art, that will be explained with reference to the embodiment of FIGS. 1-3, but are also present in the embodiment of the subsequent figures.

First, the combination of the action of cushions 20 and screws 19 allows for a very strong tightening of the filtering plates 14, squashing them to the headpiece 21. The subsequent advantage is a minimum opening of the cushions 20 during the inflation step, with a consequent increase of their resistance to explosion and greater working pressure, and a smaller time for inflation and hence higher productivity.

In comparison with the solutions providing for fixed locking positions of the movable headpiece, the use of screw 19 makes the apparatus become expansible or ri-dimensionable, allowing for the possibility of adding or removing filtering plates 14 very quickly, depending on any possible working need and without any need for modifying the frame of the apparatus, and without the need for stopping the same.

Further, the combination of the action of compression exerted by cushions 20 and screws 19 is that of obtaining, in presence of variations of the thickness of the filtering plates 14 or even only of their cloths, when replacing them because of swear or breakage or needs due to changes in the production process, a complete and automatic possibility to adapt even with changes of many centimetres.

As far as the position of cushions 20 is concerned, being them on the fixed headpiece 12 rather than on the movable headpiece 15, it is possible to realise greater cushions, with consequent increase of the pressure in the pressing step.

Further, the position of cushions 20 on the fixed headpiece 12, be it external (FIGS. 1-3) or internal (FIG. 4), but anyway close to the equipment for the inlet of the inflation fluid; implies a higher speed during the operation of inflation and deflation, with a decrease of working time.

The position of cushions 20 and of the hydraulic, electric and pneumatic equipment on the fixed headpiece 12 allows for a better control and maintenance by an operator, since he can work completely safe, clear of the reach of any moving component, in particular when the cushions are positioned on the exterior of the fixed headpiece 12.

Another advantage following to the displacement of the cushions 20 from the movable plate 15 to the fixed plate 12 and to the use of screws 19 for pressing is that of having the possibility to arrange the electric motor 22 and all the electric, hydraulic or pneumatic equipment far from the filtering plates and out of the area of unload of slurries, that, due to the features of this kind of apparatus is very dirty and not compatible with complex equipment.

Another advantage, not less important, is to be added to those above, that is the possibility of using the preliminary approaching and tightening system obtained with the screws also in the most recent filter presses, wherein lateral rails are replaced by a single upper rail.

The present invention was described for illustrative, non limitative purposes, according to its preferred embodiments, but is to be understood that variations and/or modifications can be made by the skilled in the art without escaping the scope of protection, as defined by the enclosed claims.

The invention claimed is:
1. A filter press, comprising:
a supporting frame, said supporting frame comprising a fixed headpiece, a foot and at least one longitudinal guide, said at least one longitudinal guide defining a longitudinal axis, said at least one longitudinal guide extending between the fixed headpiece on one side and the foot on the other side;
a first compressive device, configured to compress filtering plates one onto the other, said first compressive device comprising at least a first rotatable screw and a second rotatable screw, and a movable headpiece, said first and said second rotatable screws operable for locking said moveable headpiece in a position along said longitudinal axis in relation to said fixed headpiece, without a fixed locking mechanism in a discretely fixed position relative to said supporting frame and parallel to said longitudinal axis;
wherein said filtering plates are supported by said at least one longitudinal guide, said filtering plates being arranged side by side, said filtering plates extending between said fixed headpiece and said movable headpiece,
wherein said first rotatable screw is spaced apart and parallel to said second rotatable screw, said rotatable screws being oriented along said longitudinal axis,
and wherein said movable headpiece is supported by said at least one longitudinal guide, said movable headpiece comprising at least a first threaded cylindrical hole and a second threaded cylindrical hole, said first threaded cylindrical hole receiving said first rotatable screw therethrough, and said second threaded cylindrical hole receiving said second rotatable screw therethrough,
said filter press further comprising:
a second compressive device, configured to compress said filtering plates one onto the other, said second compressive device comprising at least one pneumatic or hydraulic cushion and a compression plate, wherein said at least one pneumatic or hydraulic cushion and said compression plate are positioned behind or before said fixed headpiece in relation to said moving headpiece and wherein said at least one pneumatic or hydraulic cushion are inflatable by a fluid to operate on said compression plate to compress said filtering plates between said movable headpiece and said fixed headpiece;
wherein said rotatable screws are rotatably coupled with said supporting frame, and wherein the filter press is configured so that:
said first compressive device operates first to provide a first compression force on said filtering plates,
said second compressive device operates subsequently to provide a second compression force on said filtering plates, said second compression force being greater than the first compression force;
said first compressive device operates subsequently to provide a third compression force on said filtering plates; and
said second compressive device operates subsequently to provide a final compression force on said filtering plates,
wherein said first compression force, said second compression force, said third compression force and said fourth compression force are each exerted so as to press said filtering plates one onto the other, and wherein, in operation, a slurry to be dehydrated is introduced in the filter press immediately after application of said first compression force.
2. The filter press of claim 1, wherein:
said at least one longitudinal guide comprises two lateral longitudinal guides,
said first compressive device comprise two lateral rotatable screws and wherein said movable headpiece comprises two arms,
said at least first threaded cylindrical hole and second threaded cylindrical hole comprise two threaded cylindrical holes, and
one of said threaded cylindrical holes extends through each arm.
3. The filter press of claim 1, wherein:
said at least one longitudinal guide comprises an upper longitudinal guide,
said first compressive device comprises four rotatable screws and wherein said movable headpiece comprises four corners,
said at least first threaded cylindrical hole and second threaded cylindrical hole comprise four threaded cylindrical holes, and
one of said threaded cylindrical holes extends through each corner.
4. The filter press of claim 1, wherein said first compressive device comprises at least one motor for driving said rotatable screws.
5. The filter press of claim 4, wherein said at least one motor for driving said rotatable screws is mounted on said compression plate or on said supporting frame, said rotatable screws being rotationally mounted on supports integral to said supporting frame, which comprises said fixed headpiece, said foot and said at least one longitudinal guide defining said longitudinal axis.
6. The filter press of claim 5, wherein said at least one motor for driving said rotatable screws is mounted on said compression plate and wherein said at least one pneumatic or hydraulic cushion and said compression plate are arranged at the back of said fixed headpiece and said filtering plates are sandwiched between said fixed headpiece and said movable headpiece.
7. The filter press of claim 5, wherein said at least one motor for driving said rotatable screws is mounted on said fixed headpiece and wherein said at least one pneumatic or hydraulic cushion and said compression plate are arranged before said fixed headpiece and said filtering plates are sandwiched between said compression plate and said movable headpiece.
8. The filter press of claim 1, wherein at least one pneumatic or hydraulic cushion and said compression plate are arranged on said movable headpiece said rotatable screws being rotationally mounted on supports integral to said supporting frame, which comprises said fixed headpiece, said foot and said at least one longitudinal guide defining said longitudinal axis.
9. A method of using a filter press, the filter press comprising:
a supporting frame, said supporting frame comprising a fixed headpiece, a foot and at least one longitudinal guide, said at least one longitudinal guide defining a longitudinal axis, said at least one longitudinal guide extending between the fixed headpiece on one side and the foot on the other side;
at least a first rotatable screw and a second rotatable screw;
a movable headpiece supported by the at least one longitudinal guide, the movable headpiece comprising a first threaded cylindrical hole and a second threaded cylindrical hole, said first threaded cylindrical hole receiving said first rotatable screw therethrough, and said second threaded cylindrical hole receiving said second rotatable screw therethrough, said first and said second rotatable screws operable for locking said moveable headpiece in a position along said longitudinal axis in relation to said fixed headpiece without a fixed locking mechanism in a discretely fixed position relative to said supporting frame and parallel to said longitudinal axis;

a plurality of filtering plates arranged side by side between the fixed headpiece and the movable headpiece; and pneumatic or hydraulic elements and a compression plate, wherein said pneumatic or hydraulic elements and said compression plate are positioned behind or before said fixed headpiece in relation to said movable headpiece and wherein said pneumatic or hydraulic elements are inflatable with a fluid to operate on said compression plate for pressing the plurality of filtering plates between said movable headpiece and said fixed headpiece, said method comprising:

rotating said rotatable screws so as to move the movable headpiece towards the fixed headpiece, thereby exercising a first pressing force on the plurality of filtering plates;

inflating the pneumatic or hydraulic elements, thereby exercising a second pressing force on the plurality of filtering plates;

deflating the pneumatic elements and further moving the movable headpiece towards the fixed headpiece during said deflating, thereby exercising a third pressing force on the plurality of filtering plates; and inflating the pneumatic or hydraulic elements, thereby exercising a further pressing force on the plurality of filtering plates;

wherein said first pressing force, said second pressing force, said third pressing force and said further pressing force are each exerted so as to press said filtering plates one onto the other, and wherein the method further comprises:

optionally locking, using said first and said second rotatable screws, said moveable headpiece in said position along said longitudinal axis in relation to said fixed headpiece: and upon said locking, optionally unlocking said movable headpiece by a subsequent rotational movement of said rotatable screws.

10. A filter press, comprising:

a supporting frame, said supporting frame comprising a fixed headpiece, a foot and at least one longitudinal guide, said at least one longitudinal guide defining a longitudinal axis, said at least one longitudinal guide extending between the fixed headpiece on one side and the foot on the other side;

a first compressive device, configured to compress filtering plates one onto the other, said first compressive device comprising at least a first rotatable screw and a second rotatable screw, and a movable headpiece, wherein said filtering plates are supported by said at least one longitudinal guide, said filtering plates being arranged side by side, said filtering plates extending between said fixed headpiece and said movable headpiece, wherein said first rotatable screw is spaced apart and parallel to said second rotatable screw, said rotatable screws being oriented along said longitudinal axis, wherein said first and said second rotatable screws operable for locking said moveable headpiece in a position along said longitudinal axis in relation to said fixed headpiece, without a fixed locking mechanism in a discretely fixed position relative to said supporting frame and parallel to said longitudinal axis;

and wherein said movable headpiece is supported by said at least one longitudinal guide, said movable headpiece comprising at least a first threaded cylindrical hole and a second threaded cylindrical hole, said first threaded cylindrical hole receiving said first rotatable screw therethrough, and said second threaded cylindrical hole receiving said second rotatable screw therethrough, said filter press further comprising: a second compressive device, configured to compress the filtering plates one onto the other, said second compressive device comprising at least one pneumatic or hydraulic cushion and a compression plate, which are positioned before or after said fixed headpiece in relation to said movable headpiece, the second compressive device being operable for compressing said filtering plates one onto the other upon inflating the at least one pneumatic or hydraulic cushion with a fluid, wherein said rotatable screws are rotatably coupled with said supporting frame.

* * * * *